Feb. 26, 1952 P. SPENCE 2,587,401
FLOAT VALVE AND THE LIKE
Filed Sept. 14, 1945
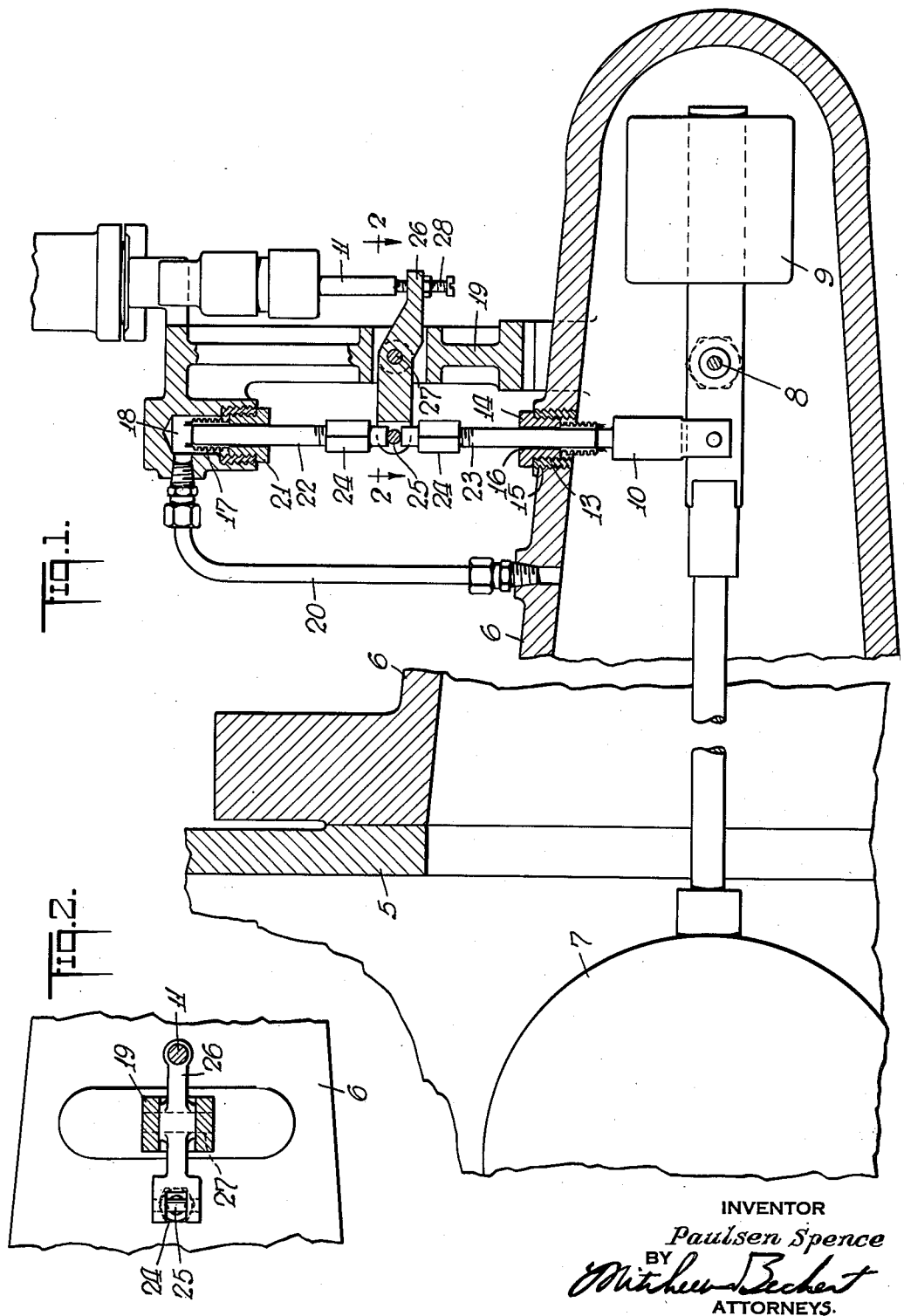
INVENTOR
*Paulsen Spence*
BY
*Mitchell Bechert*
ATTORNEYS.

Patented Feb. 26, 1952

2,587,401

UNITED STATES PATENT OFFICE 2,587,401

FLOAT VALVE AND THE LIKE

Paulsen Spence, Baton Rouge, La., assignor to Spence Engineering Company, Inc., Walden, N. Y., a corporation of New York Application September 14, 1945, Serial No. 616,323

2 Claims. (Cl. 286—1)

My invention relates to a float valve or the like and more particularly to means for transmitting motion from one side of a wall to the other side thereof when the wall is subjected to different pressures, without the necessity for the usual high friction stuffing-boxes.

Heretofore, the motion of a float valve or the like has been transmitted through the wall of the float chamber or other vessel by means of a shaft or rod extending through the wall. Such rods or shafts have necessarily passed through stuffing-boxes or the like, and particularly when pressures at the inside and outside of the float chamber were greatly different, the stuffing-boxes were so tight that the frictional force on the rod or shaft has been so great as to preclude a free and easy movement, and it has therefore been difficult to maintain a float level within relatively narrow limits.

It is an object of my invention to provide an almost friction free means for transmitting motion from one side of a wall to the other when the wall is subjected to different pressures at opposite sides.

It is another object to provide means for transmitting motion from one side of a wall to the other side thereof when the wall is subjected at opposite sides to different pressures, without the necessity for stuffing-boxes and the like.

It is another object to provide improved details of construction in a float valve or the like.

Other objects and various features of novelty and improvement will be hereinafter set forth or will become apparent to those skilled in the art.

In the drawings which show, for illustrative purposes only, a preferred form of the invention—

Fig. 1 is a broken, sectional view through a vessel having a float chamber, and illustrating the invention;

Fig. 2 is a sectional view, taken substantially in the plane of the line 2—2 of Fig. 1.

In the drawings, I indicate a pressure vessel 5 having a float chamber 6 secured thereto. Within the vessel or float chamber is a float 7, and the float arm may be mounted on a pivot 8 within the float chamber, as is usual practice. If desired, a counterweight 9 may be carried by the float arm for the usual purpose. The float arm may carry an actuator 10 for imparting the motion of the float arm to an actuated part. The part to be actuated may be any control or switch member and as shown is a pilot valve stem 11 for controlling a valve to maintain a definite liquid level in the vessel 5.

The invention relates particularly to the practically frictionless means of transmitting movement of the part 10 at one side of the chamber wall 6 to a control or other member 11 at the opposite side of the wall when the two sides are subjected to different pressures. In the preferred form I employ bellows means insertable from outside the chamber wall and serving to seal an opening through the wall 6 and so arranged that the pressures at the inner and outer sides of the wall will be balanced so that motion imparted to the bellows may be transmitted through a rod or other linkage passing freely through the wall, or at least in position to be actuated by the bellows means. Preferably two bellows devices are employed and are so mounted that the pressure at the inside of the wall is freely transmitted to each bellows device at one side and the pressure prevailing at the other side of the wall is freely transmitted to the other sides of each bellows device. The bellows devices are so mounted in relation to the wall that the effect of one will substantially counterbalance the effect of the other and the two bellows devices are connected by suitable linkage means to a part to be actuated.

In the form illustrated I employ two bellows devices, one of which is mounted directly in the wall 6, while the other may be mounted in a separate chamber, if desired, but in communication with the float chamber so that the two bellows devices will tend to balance each other, and so that both bellows devices may be said to be sealed with respect to the same chamber means. As is illustrated, a bellows device 12 in the form of a closed cup may be sealed to a gland or flanged member 14, covering a hole in the wall 6 in suitable manner. As shown, the upper end of the bellows 12 is soldered, sweated, or otherwise rigidly secured as at 13 to a gland bushing or nut 14 externally insertable through the hole in the wall 6, with the bellows 12 projecting inwardly toward the chamber defined by wall 6. The outside of bellows 12 may thus be subjected to the pressure within the chamber means, while the inside of bellows 12 is subjected to the pressure outside the chamber means. If desired, the gland nut 14 may be screwed into a threaded opening in a very hard metal bushing 15, which may itself be screwed into the wall 6 and welded or otherwise secured thereto so as to be hermetically sealed in the wall. While the hard metal bushing 15 need not necessarily be employed, since the gland nut 14 may be screwed directly in the wall 6, yet the bushing 15 is advantageous in that repeated screwing and unscrewing of the gland nuts 14 would not cause any appreciable wear in the threads. The gland nut 14 has an opening 16 therein so that one side of the bellows is subjected to atmospheric pressure while the other side is subjected to the pressure prevailing in the float chamber. To provide for ready insertion of the gland nut 14 and bellows 12, the external diameter of the bellows 12 preferably is less than the insertion-hole diameter; in the form shown, the diameter of bellows 12 is thus preferably less than the root diameter of the threaded part of the body of gland nut 14.

In the form illustrated, instead of securing the other bellows 17 directly in the float chamber and connecting the two bellows devices by counterbalancing linkage, I secure the bellows 17 in a chamber 18, which may be formed in a valve bracket 19 and connected as by means of a pipe 20 with the float chamber. The bellows 17 may be and preferably is in all respects substantially the same as the bellows 12 and is secured to the gland nut 21, as heretofore described, the outside of bellows 17 may thus be subjected to the pressure within the chamber means, while the inside of bellows 17 is subjected to the pressure outside the chamber means. The gland nut 21 may be identical with the nut 14. It will be seen, therefore, that the two bellows devices 12—17 will be subjected at corresponding sides to the pressure existing in the float chamber, while the opposite corresponding sides will be subjected through the openings in the gland nuts to atmospheric pressure. Therefore, the two bellows devices when connected by suitable linkage will tend to balance each other so far as pressures are concerned.

The two bellows devices 12—17 may be connected by rod linkage means which may comprise separate rods 22—23 passing loosely through the guide bores of gland nuts 14—21, and provided at their adjacent ends with adjustable means such as nuts 24. The rods 22—23 are engaged with the two bellows devices and the rod ends adjusted so as to be in position to coact with, say, a pin 25 on a lever 26, pivoted at 27 to the bracket 19. An adjusting screw 28 may be interposed between the control part 11 and the lever 26. Thus, when the float 7 rises, the motion of the part 10 will be transmitted to the bellows 12 and through the rod 23 to the lever 26 and control member 11. Since the pressures on the two bellows devices counterbalance each other, and since the rod members 22—23 pass freely through the gland nuts, there will be practically no resistance to the movement of the rods, and yet there will be a perfect seal where the rod 23 passes through the float chamber wall. The bellows devices themselves must be compressed or expanded during movement of the float arm, but the bellows devices are so flexible that they offer practically no resistance to the slight deformation required during movement of the float arm.

While the invention has been described in considerable detail and a single form illustrated, it is to be understood that there may be various other arrangements of bellows devices and various forms of linkage mechanisms constituting counterbalancing means and motion transmitting means, all within the scope of the invention as defined in the appended claims.

I claim:

1. In a float valve or the like, chamber means to be subjected to different pressures at the inside and outside thereof, and means for transmitting motion between the inside and the outside of said chamber means, said means including two bushings; each bushing including an externally threaded body having a guide bore, an integral external flange, and a bellows closed at one end and secured at the other end to the internal end of said body, said bellows being of lesser diameter than the threads of said body; said chamber means including two spaced chambers with a fluid-communicating duct between said chambers, said respective bushings being threadedly inserted in said respective chambers with the bellows projecting internally and the flanges externally of said chambers, whereby the outside of both of said bellows may be subjected to the same pressures within said chamber means and whereby both said bellows may be effectively concealed and protected within said chamber means, and means including stem means insertable externally through the guide bores of said bushings and operatively connecting the closed ends of each of said bellows in opposition.

2. In a float valve or the like, chamber means to be subjected to different pressures at the inside and outside thereof, and means for transmitting motion between the inside and the outside of said chamber means, said means including two bushings; each bushing including an externally threaded body having a guide bore, an integral external flange, and a bellows closed at one end and secured at the other end to the internal end of said body, said bellows being of lesser diameter than the threads of said body; each of said bellows having an inside and an outside and being sealed with respect to said chamber means, the insides of both bellows being sealed for communication only with the pressure on the outside of said chamber means, and the outsides of both bellows being sealed for communication only with the pressure on the inside of said chamber means.

PAULSEN SPENCE.

REFERENCES CITED

The following references are of record in the file of this patent:

UNITED STATES PATENTS

| Number | Name | Date |
| --- | --- | --- |
| 82,276 | Belleville | Sept. 22, 1868 |
| 1,209,673 | Coggin | Dec. 26, 1916 |
| 1,377,981 | Holdsworth | May 10, 1921 |
| 1,527,154 | Mallory | Feb. 17, 1925 |
| 1,796,537 | Rossiter | Mar. 17, 1931 |
| 1,983,106 | Sundstrom | Dec. 4, 1934 |
| 2,263,252 | Tallman | Nov. 18, 1941 |